Jan. 15, 1957 C. M. SIMPSON 2,777,334
TRACTOR TRANSMISSION AND MOTOR CONTROL MEANS
Filed May 7, 1951
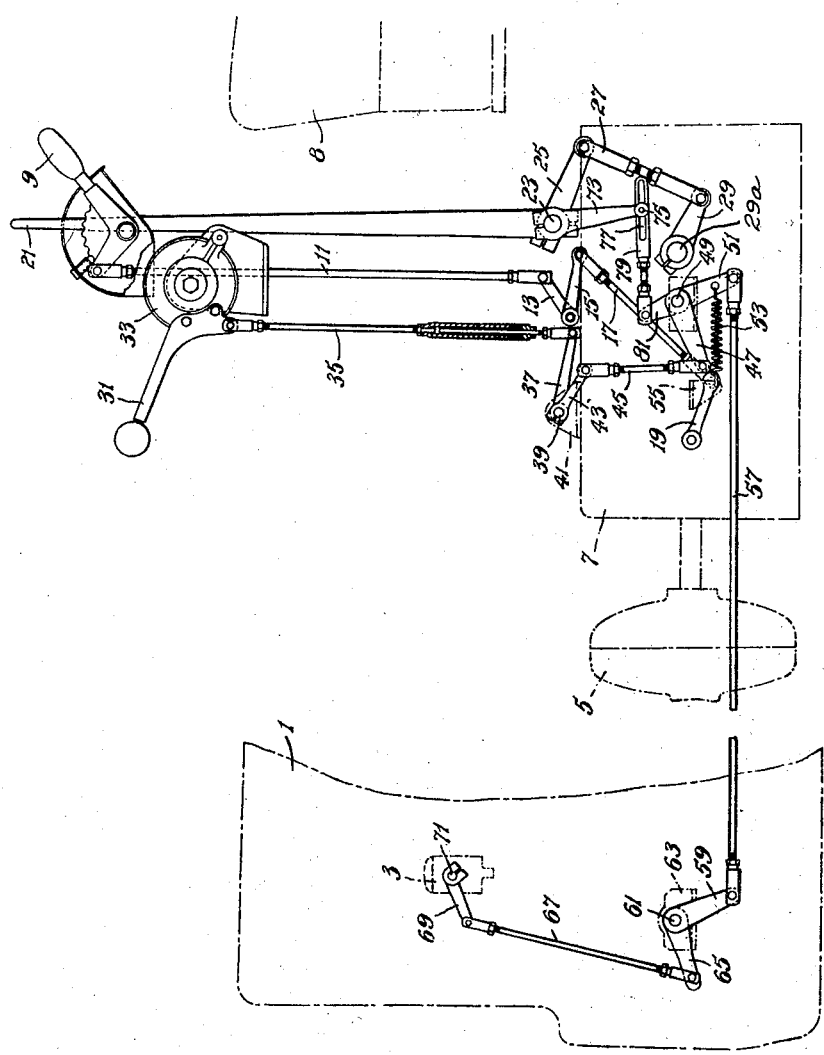
INVENTOR
Cyril Maurice Simpson
ATTORNEYS

United States Patent Office 2,777,334
Patented Jan. 15, 1957

2,777,334

TRACTOR TRANSMISSION AND MOTOR CONTROL MEANS

Cyril Maurice Simpson, Coventry, England, assignor to The Daimler Company Limited, Coventry, Warwickshire, England Application May 7, 1951, Serial No. 224,863

Claims priority, application Great Britain May 12, 1950

2 Claims. (Cl. 74—472)

This invention is concerned with improvements in or relating to tractors. More particularly, but not exclusively, the invention is concerned with those tractors which may carry ancillary equipment (for example, winches) and which are employed for such operations as earth scraping and earth moving. Furthermore, the tractors may be of either the endless track type or the wheeled type.

It appears that up to the present, tractors have embodied in their transmission systems a friction-type clutch and a gear box of the conventional sliding gear type, the latter being provided with forward gears and reverse gears. The desirability of using such transmission systems has not, as far as I am aware, been questioned to any extent over the period of years during which they have been used, but such a transmission system renders the operation of driving a tractor, particularly one of the endless track type, more involved than is desirable.

With previously-employed tractors of the endless track type, both feet of a driver need to be kept generally free for braking either one or other of the two tracks in order to steer the tractor and in some such tractors it is also necessary for him to use his feet for gear-changing purposes.

Furthermore seeing that he may be using at least one hand for operating the ancillary equipment it is desirable that the remaining hand operations for operating the several controls be reduced to a minimum. For instance, when changing gear in previously-employed tractors, the throttle valve (which is controlled by a hand lever and which controls the supply of fuel to the engine) must first be closed, or at least partially closed, to prevent racing of the engine during gear changing, the clutch pedal must be depressed, the gear changing lever moved by hand to its desired position and then the clutch is again engaged and the throttle valve opened. By reason of these several operations it is not unknown for drivers of such tractors to bring them to rest, or nearly so, when changing gear.

At the same time, there are several disadvantages which are attendant upon the use of a transmission system embodying a friction-type clutch and a gear box of the sliding gear type.

One such disadvantage is that, as stated above, the tractor is usually brought to rest, or nearly so, when changing gear. Furthermore, the tractor may accidentally be brought to rest at any time during its operation since the risk of stalling the engine is always present, such stalling being caused either by faulty driving, especially in low gear, or by attempting to deal with too heavy a load. If stalling does occur, the engine must be restarted before the tractor can move off again, and for this purpose it may be necessary to have recourse to an involved procedure. Consequently such a tractor will take an appreciable time to cover a stretch of ground of a varying nature and contour.

Another disadvantage lies in the fact that the ancillary equipment is normally driven from the shaft connecting the clutch to the gear box and consequently during gear changing the equipment is no longer driven.

It has now been found that if the transmission system hitherto used on tractors is replaced by one embodying a hydraulic coupling in association with an epicyclic gear box of the kind wherein a pre-selector unit is made operative by the application of a brake to a reactive drum connected with either the annulus, sun pinion or planet carrier of the gear unit, then not only are the several disadvantages minimised and in some cases overcome, but also, unexpectedly, there is a marked improvement in the all-round efficiency of the tractor.

In a tractor according to the invention, a speedy change of gear is obtained at all times since when a change is made the speed of the tractor need not be decreased unduly. Furthermore, the operation of changing gear will only involve (a) preselecting a suitable gear at any time before it is required (that is to say, an operator can prepare beforehand for any change in the nature or contour of ground which he is approaching) and (b) engaging that gear by a simple hand control at the required instant, or by a pedal.

This ease of gear changing is especially marked when changing from a forward to a reverse gear since it is only necessary to engage the required gear by moving the appropriate hand control, the tractor then coming to rest smoothly and moving off in the opposite direction.

As stated above, the throttle valve must first be closed, or at least partially closed, during a gear-changing operation in order to prevent racing of the engine at that time.

In a tractor having a transmission system embodying a hydraulic coupling and a pre-selector epicyclic gear box, the throttle valve may readily be adapted to be automatically at least partially closed just prior to the engagement of a preselected gear and opened to its previous position just after engagement of that preselected gear.

The accompanying drawing shows an automatic throttle valve controlling arrangement for use in a tractor having a transmission system which embodies a hydraulic transmission device and an epicyclic gear box.

A tractor of the endless track type in accordance with the embodiment of the invention shown in the accompanying drawings, has an engine 1, a carburetter 3, a transmission system which includes a hydraulic coupling 5 and a preselector epicyclic gear box 7 and a seat 8. The epicyclic gear box 7 may be of the type disclosed in British Patent No. 328,660 to which reference may be had for a detailed illustration and description thereof, it being believed to be sufficient for the purposes of the present invention to explain that in such a gear box, pre-selected gear changes are made by rotation of a shaft which controls the gear changing mechanism. Consequently a desired gear may be manually preselected by hand lever 9 operating through linkages 11, 13, 15, 17 and 19 at any time before it is required, and may subsequently be engaged by movement of a manually-operated gear-engaging lever 21. The gear-engaging lever 21 is mounted at its lower end on a shaft 23, which is connected through suitable linkages 25, 27 and 29 to the controlling shaft 29a of the gear changing mechanism in the gear box 7.

The throttle valve which controls the supply of fuel to the carburetter is opened or closed by means of a hand lever 31 (shown in the "closed" position) mounted between two friction plates, only one of which, 33, is shown in the drawing. This handle is connected to one end of an adjustable and extensible control rod 35, the other and lower end of which is fastened to the end of one arm 37 of a bell crank lever mounted on a shaft 39 carried by a bracket 41 suitably mounted on the gear box. The other arm 43 of the bell crank lever is connected to one end of a rod 45, the other end of which is connected to arm 47 of a three-armed lever mounted on a shaft 49. A second arm 51 of this three-armed lever is connected by a spring 53 to a bracket 55 also carried by the gear box, and the end of this second arm is joined by a link 57 to an arm 59 of another bell crank lever. This bell crank lever is mounted on a shaft 61 carried by a bracket 63 suitably mounted on the engine casing, and its other arm 65 is connected to an end of a link 67. The link 67 is connected at its other end to a lever 69 mounted on the throttle valve control shaft 71 of the carburetter 3.

There is keyed on the shaft 23 a lever 73 which is provided with a pin 75. The pin 75 engages with an elongated slot 77 formed in the flattened end of a link 79 attached to arm 81 of the aforesaid three-armed lever forming part of the manual throttle operating mechanism, and allows some lost motion of the pin in the slot.

The relation of the pin 75 and slot 77 is such that on movement of the gear-engaging lever 21 to rotate the shaft 29a and thereby engage a preselected gear the pin first moves freely within the slot, thereby providing the lost motion and then engages an end of the slot, further movement of the pin urging the throttle operating mechanism (independently of the manual throttle control) against spring pressure so as at least partially to close the throttle. When the gear has been engaged, the gear-engaging lever is moved back towards its original position, thereby moving the pin back towards its original position and so automatically opening the throttle.

In actual operation the throttle valve is set, at the outset, by the manual control so as to give a maximum power output, and is maintained in such position throughout the course of operation. The pin and slot connection ensures that the initial setting of the throttle valve is not changed when the throttle valve is automatically opened after automatic closure or partial closure during gear changing and thus the maximum power is obtained.

There is no risk of stalling the engine in a tractor according to the invention, either as an outcome of faulty driving or by reason of an excessive load. In fact, the only effect is that of slip in the hydraulic coupling.

On a steep up-grade the risk of the tractor running backwardly is considerably reduced as compared with a previously-employed tractor, since the tractor may be held stationary without the use of brakes merely by engaging a low gear and keeping the throttle open.

An additional feature of a tractor in accordance with the invention is that the transmission system readily lends itself to power operation without any undue increase in the size of the tractor. With a tractor embodying the more orthodox type of transmission system, power operation is not easily obtained and may only be obtained by the addition of much equipment occupying a large amount of space.

It will be appreciated that the invention is not limited to tractors of the endless track type, as described, but also may be applied to wheeled tractors.

Having thus described my invention, what I claim as new and desire to secure by Letters Patent is:

1. A power transmission for tractors having an engine and a fuel control valve therefor, a hydraulic coupling and a pre-selector gear box for different gear ratios, comprising in combination, means for pre-selecting a gear ratio, means for making effective the pre-selected gear ratio, means including a manually operable lever for opening and closing the fuel control valve to control the operation of the engine, a manually operable lever forming part of said means for making effective a gear ratio, and means including a pin and slot mechanism interconnecting said levers for opening and closing the fuel control valve in such manner that the fuel control valve is adapted automatically to be at least partially closed just prior to making effective a pre-selected gear ratio and to be opened to its previous position just after the pre-selected gear ratio has been made effective.

2. A power transmission for tractors having an engine and a fuel control valve therefor, a hydraulic coupling and a pre-selector gear box to provide different gear ratios, comprising in combination, manually operable means for pre-selecting a gear ratio change in the gear box, means including a first manually operable lever for opening and closing the fuel control valve, a second manually operable lever for effecting the pre-selected gear ratio changes, and means including a lost-motion interconnection between said levers operative by movement of said second lever in one direction to at least partially close the fuel control valve independently of said first lever prior to effecting a gear ratio change, and a spring operative when said second lever is moved in the opposite direction to open the fuel control valve after the gear ratio change has been made.

References Cited in the file of this patent

UNITED STATES PATENTS

| | | |
|---|---|---|
| 976,834 | Saurer | Nov. 22, 1910 |
| 2,067,848 | Hnizdo et al. | Jan. 12, 1937 |
| 2,122,488 | Patterson | July 5, 1938 |
| 2,303,519 | Wilson | Dec. 1, 1942 |
| 2,329,724 | Maurer | Sept. 21, 1943 |
| 2,349,937 | Buchhart | May 30, 1944 |
| 2,399,795 | Everett | May 7, 1946 |
| 2,513,333 | Keese et al. | July 4, 1950 |
| 2,557,421 | Evernden | June 19, 1951 |
| 2,703,636 | Long | Mar. 8, 1955 |

FOREIGN PATENTS

| | | |
|---|---|---|
| 328,660 | Great Britain | May 5, 1930 |
| 434,874 | Great Britain | Sept. 10, 1935 |
| 617,222 | Great Britain | Feb. 2, 1949 |